Oct. 13, 1959
C. H. KANGAS
2,908,521
FLUID SEAL FOR RELATIVELY ROTATING MEMBERS
Filed Aug. 10, 1955
2 Sheets-Sheet 1
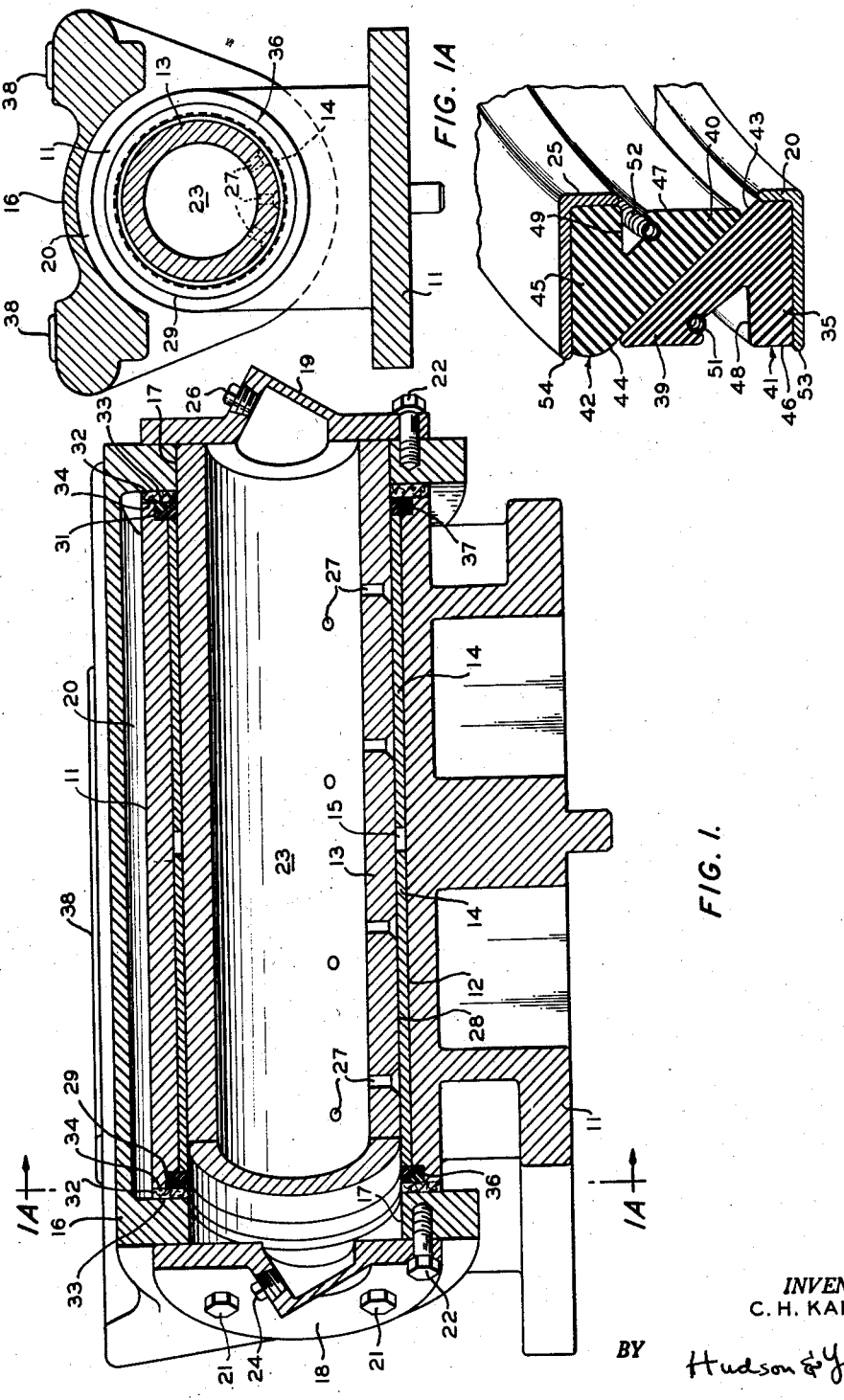
INVENTOR.
C. H. KANGAS
BY Hudson & Young
ATTORNEYS Oct. 13, 1959     C. H. KANGAS     2,908,521
FLUID SEAL FOR RELATIVELY ROTATING MEMBERS
Filed Aug. 10, 1955     2 Sheets-Sheet 2

INVENTOR.
C. H. KANGAS
BY Hudson & Young
ATTORNEYS

United States Patent Office
2,908,521
Patented Oct. 13, 1959

2,908,521

FLUID SEAL FOR RELATIVELY ROTATING MEMBERS

Charles H. Kangas, Bartlesville, Okla., assignor to Phillips Petroleum Company, a corporation of Delaware Application August 10, 1955, Serial No. 527,459

10 Claims. (Cl. 288—16)

This invention relates to an improved fluid seal for relatively rotating members in sealed relation with each other. In one aspect this invention relates to an improved fluid seal comprising two flexible elements, one attached to a rotating member and the other to a stationary member.

In center bearing assemblies for oil well walking beam pumping units single member fluid sealing rings have heretofore been employed to effect a fluid seal between the relatively rotatable shaft and housing members at each end thereof and to prevent both the egress of lubricant from the assembly and the ingress of dust, sand, or other foreign matter between the shaft and the sealing rings and between the shaft and the bearings. However, in the operation of these pumping units in dusty or sandy areas, frequent replacement of the fluid sealing rings is necessary. Such replacements are primarily due to the excessive wear at the point where the sealing rings contact the shaft. This excessive wear is caused by the ingress of dust or sand at this point and when the wear is severe, the sealing rings are no longer able to maintain an effective seal between the relatively rotating members.

Frequent replacement of the sealing rings necessitates taking the pumping unit out of operation and the use of heavy hoisting equipment to lift the beam from the bearing assembly. Also, very severe wear on the shaft is not uncommon and this means replacement of the shaft in addition to the replacement of the sealing rings.

Accordingly, an object of this invention is to provide an improved fluid seal for relatively rotating members which will completely eliminate wear between the shaft and fluid seal due to the ingress of dust or sand.

Another object of this invention is to provide an improved fluid seal having a minimum number of parts and at all times maintaining an effective seal between relatively rotating members.

A further object is to provide an improved seal for the center bearing assembly of an oil well walking beam pumping unit.

A still further object is to provide an improved fluid seal for relatively rotating members which will permit lower wear and cause all wear to occur between two flexible elements which comprise said improved fluid seal.

Further objects, advantages, and features will become apparent upon examination of the accompanying discussion, drawings, and appended claims.

The fluid seal of this invention comprises two annular flexible elements adapted to effect a uniform seal between relatively rotating members, such as a rotating shaft and a stationary housing. These annular flexible elements have coincident conical sealing surfaces thrust toward each other into sealing contact. One of these flexible elements is tightly fitted to a rotating member and rotatable therewith, while the other flexible element is tightly fitted to a stationary member and stationary therewith. All the wear that occurs takes place between the coincident conical sealing surfaces.

More complete understanding of my invention will be facilitated upon reference to the drawings in which:

Figure 1 is a cross-sectional view of a center bearing assembly for a walking beam pumping unit embodying a preferred form of the invention, Figure 1A is a cross-sectional view of the center bearing assembly shown in Figure 1 taken along the line 1A—1A.

Figure 2 is a cross-sectional view of the preferred embodiment of my invention,

Figure 6:
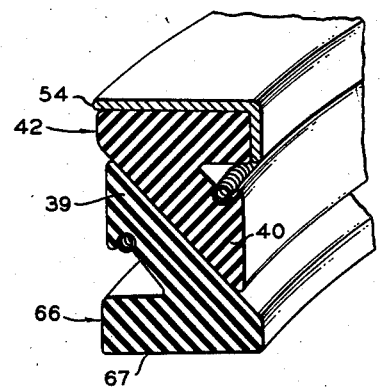
Figure 7:
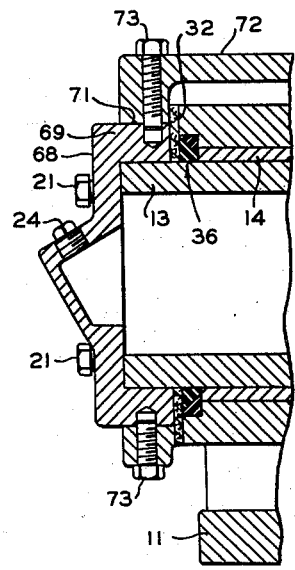

Figures 3, 4, 5, and 6 are cross-sectional views of my invention in modified forms, and Figure 7 is a cross-sectional view showing the application of my invention in a modified form of the center bearing assembly shown in Figure 1.

In the center bearing assembly showing in Figure 1, base 11 which is secured to the Samson post of a walking beam pumping unit (not shown) provides support for the center bearing assembly and is provided with a central cylindrical passage 12 for shaft 13. Between shaft 13 and base 11 are fitted bearings 14, which may be made of brass and spaced at 15 and are connected to base 11 by dowel pins (not shown). Saddle 16 is provided with annular openings 17 into which the respective ends of shaft 13 extend and are flush with the outside radial walls of saddle 16. Although the left hand end of shaft 13 is shown in the drawing cut away to show other details of construction, it abuts the inside of cap 18. Saddle 16 is also provided with an inner space 20 which is partially taken up by the top part of base 11. Caps 18 and 19 are secured to shaft 13 by screws 21 and to saddle 16 by screws 22. Shaft 13 has a hollow 23 and carries a lubricant supplied therein through the pipe plug 24 in cap 18. Cap 19 is fitted with a breather plug 26. Radial passages 27 are provided in shaft 13 to allow lubricant within shaft hollow 23 to flow therethrough and lubricate the bearing surface 28. Base 11 is provided with inner annular recesses 29 and 31. Gaskets 32, which can be made of felt or any other suitable material, are positioned between the inner radial walls 33 of saddle 16 and the outer radial walls 34 of base 11. Within recesses 29 and 31 are positioned the fluid seals 36 and 37 of the instant invention. Saddle 16 is provided with bases 38 (only one of which is shown in Figure 1) upon which rests the walking beam (not shown) of a pumping unit.

Figure 2 shows a preferred embodiment of my improved fluid sealing means in which annular flexible elements 41 and 42 are concentric with shaft 13 of Figure 1 and have coincident conical sealing surfaces 43 and 44. The radial walls 46 and 47 are provided with annular grooves 48 and 49 in which spiral springs 51 and 52 are fitted in radial contact therewith. Spiral springs 51 and 52 are so sized that they cause respective flexible elements 41 and 42 to be thrust toward each other into sealing contact at their respective sealing surfaces 43 and 44.

The inner periphery of flexible element 41 and the outer periphery of flexible element 42 preferably are provided with metal support rings 53 and 54, respectively. The flexible element 41 is tightly secured to shaft 13 of Figure 1 by the metal support ring 53 which is circumferentially press fitted to shaft 13. Similarly, flexible element 42 is tightly secured to base 11 of Figure 1 by the metal support ring 54 which is circumferentially press fitted to base 11 in annular recesses 29 and 31. Metal support rings 53 and 54 have substantially the same width as recesses 29 and 30, respectively, and are provided with annular flanges 20 and 25 which will abut the gaskets 32 of Figures 1 and 7 and will aid in securing their respective flexible elements 41 and 42 thereto.

Preferably the two flexible elements 41 and 42 are both made of graphite impregnated flexible materials. However, the outer flexible element 42 is more preferably somewhat harder and stiffer than inner flexible element 41 to provide a firm support. For example, the outer flexible element 42 can be made of a graphite impregnated Teflon, a tetrafluoroethylene polymer plastic, while the inner flexible element can be made of graphite impregnated neoprene. The flexible elements 41 and 42 are preferably vulcanized or otherwise secured to metal support rings 53 and 54, respectively. This insures against fluid leakage between flexible elements 41 and 42 and their respective metal support rings 53 and 54. Flexible elements 41 and 42 are made thick enough to permit cutting or forming of annular grooves 48 and 49 for springs 51 and 52, leaving sufficient body, however, for depending portions 39 and 40. Thus, the springs 51 and 52 thrust the depending portions 39 and 40 towards the heel portions 35 and 45 of the respective flexible elements 41 and 42. The outer peripheries of the metal support rings 53 and 54 may be ground, polished, or otherwise finished to provide a close fit to shaft 13 and base 11, respectively. The metal support rings 53 and 54 are made of ductile material such as cold rolled steel, for example, and are adapted to press-fit shaft 13 and base 11, respectively.

The saddle 16 and shaft 13 axially rock back and forth while the base 11 is stationary and since the operation of this type of center bearing assembly is well known in the art of oil well pumping units it is unnecessary to detail such operation here. Reference may be had to U.S. Patent 2,188,583 to Trout et al. of January 30, 1940, for a description of a conventional oil well pumping unit.

My improved fluid seal is particularly well suited for use in dusty or sandy areas and since flexible element 41 is tightly fitted to the periphery of shaft 13 it rotates therewith at the same velocity, while flexible element 42 which is closely fitted to base 11 is stationary therewith. Thus, the only wear that can occur will take place between the two flexible elements 41 and 42 at sealing surfaces 43 and 44. A considerable amount of wear can thus be tolerated, even in dusty or sandy areas, before my fluid seal must be replaced. Any lubricant or other fluid tending to flow from the shaft hollow 23 between shaft 13 and base 11 is necessarily brought into contact with fluid seals 36 and 37, with the result that egress of lubricant is substantially prevented and the small amount of lubricant which is picked up by the relative rotation of the flexible elements 41 and 42 serves to lubricate the sealing surfaces 43 and 44 and reduce wear further. Any dust, sand, or other foreign matter which enters the bearing assembly comes into contact with fluid seals 36 and 37 and is prevented from getting between the relatively rotating members. Small amounts of matter that are taken up by the relatively rotating flexible elements 41 and 42 causes only limited wear between the sealing surfaces 43 and 44.

Figure 3:
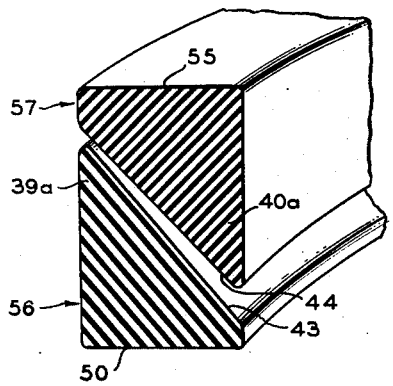

In the modification of my fluid seal shown in Figure 3, elements 56 and 57 are made sufficiently flexible in order that sealing surfaces 43 and 44 come into sealing contact when flexible elements 56 and 57 are tightly fitted to the shaft 13 and base 11 members of Figure 1, respectively. In this embodiment, metal support rings and spiral springs are dispensed with. Figure 3 shows the form the depending portions 39a and 40a take prior to being assembled. In this embodiment of my fluid seal the means which thrust the flexible elements 56 and 57 together resides in the inherent flexibility of said elements. Because the flexible elements 56 and 57 are cut or formed so that the sealing surfaces 43 and 44 are non-parallel when they are in spaced relation, an appreciable amount of wear can be tolerated on these surfaces 43 and 44 when they are in contact without hindering the effectiveness of the seal. It is to be understood, however, that the sealing surfaces of the flexible elements shown in the Figures 2, 4, 5 and 6 are also preferably non-parallel when the said elements are in spaced relationship. The inner periphery 50 of flexible element 56 has a diameter a few thousandths of an inch smaller than the outer diameter of shaft 13 to effect a tight fit between the two in order that no slippage occurs when the two rotate together. Similarly, the outer periphery 55 of flexible element 57 has a diameter a few thousandths of an inch larger than the annular recess wall of base 11 in order that flexible element 57 remains stationary therewith. The embodiment of Figure 3 is a more economical design to manufacture because of the elimination of spring and metal support rings and because the flexible elements are somewhat easier to fit.

Figure 4:
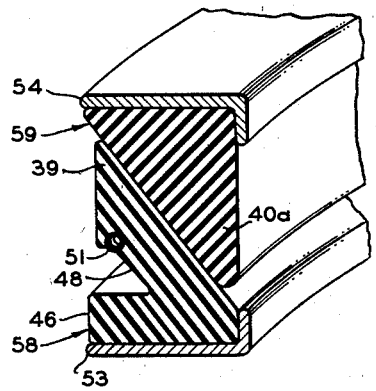
Figure 5:
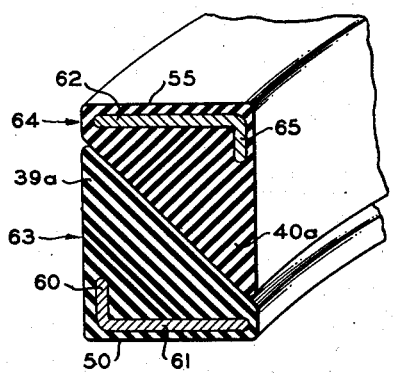

In Figure 4, the inner flexible element 58 has an annular groove 48 in radial wall 46 and the sealing contact is effected by the flexibility of depending portions 39 and 40a augmented by spiral spring 51. The flexible elements 58 and 59 are provided with metal support rings 53 and 54, respectively. In Figure 5, metal support rings 61 and 62, provided with annular flanges 60 and 65, are imbeded in flexible elements 63 and 64 generally adjacent their inner and outer peripheries 50 and 55, respectively. In Figure 6, a metal support ring 54 is secured to outer flexible element 42 while the inner flexible element 66 has an inner periphery 67 of smaller diameter than shaft 13 to facilitate assembly.

In Figure 7, the application of my fluid seal 36 to a modified form of the center bearing assembly of Figure 1, is shown. Cap 68 has an inner annular flange 69 which fits into annular opening 71 of saddle 72 and is secured thereto by screws 73. In this modified form of the center bearing assembly access to the interior of base 11 can be obtained by removing cap 68, thus obviating the necessity for utilizing a hoist to lift the saddle 72 when replacement of fluid seal 36 is required.

The invention has been illustratively set forth above in relation to a bearing assembly in which a shaft of relatively large diameter rocks back and forth at a relatively slow velocity within a stationary base or housing; however, the invention is equally applicable to a shaft revolving within a housing, or with a housing revolving about a shaft, or where such shafts protrude through the housing.

Although the invention has been described in detail, many additional modifications and advantages will become apparent to those skilled in the art without departing from the scope or spirit of the invention.

Having described my invention, I claim:

1. A fluid seal means comprising annular non-segmental first and second flexible relatively concentric elements, said elements being relatively rotatable and having their concentrically opposed faces adapted to serve as coincident conical sealing surfaces, said first and second elements in their concentrically assembled positions being substantially bounded within the area defined by two radial planes, said sealing surfaces extending across the axial dimension of said area bounded.

2. A fluid seal means according to claim 2 wherein said second element is comprised of material having less flexibility than said first element.

3. A fluid seal means comprising annular non-segmental first and second flexible relatively concentric elements, said elements being relatively rotatable and having their concentrically opposed faces adapted to serve as coincident conical sealing surfaces, each of said elements having a radial cross section substantially in the form of a right triangle, an annular groove in the radial wall of said first element, and a spiral spring in radial contact with said annular groove whereby said first element can expand and come into sealing contact with said second element at their said respective sealing surfaces, said first and second elements in their concentrically assembled positions being substantially bounded within the area defined by two radial planes, said sealing surfaces extending across the axial dimension of said area bounded.

4. A fluid seal means comprising annular non-segmental first and second flexible relatively concentric elements, said elements being relatively rotatable and having their concentrically opposed faces adapted to serve as coincident conical sealing surfaces, each of said elements having a radial cross section substantially in the form of a right triangle, annular grooves in the radial walls of said elements, and spiral springs in each of said annular grooves and in radial contact therewith whereby said elements are thrust toward each other into sealing contact at their said respective sealing surfaces, said first and second elements in their concentrically assembled positions being substantially bounded within the area defined by two radial planes, said sealing surfaces extending across the axial dimension of said area bounded.

5. A fluid seal means comprising annular non-segmental first and second flexible relatively concentric elements, said elements being relatively rotatable and having their concentrically opposed faces adapted to serve as coincident conical sealing surfaces, each of said elements having a radial cross section substantially in the form of a right triangle, said first element rigidly secured at its inner periphery to a first metal ring, said second element rigidly affixed at its outer periphery to a second metal ring, said first and second elements in their concentrically assembled positions being substantially bounded within the area defined by two radial planes, said sealing surfaces extending across the axial dimension of said area bounded.

6. A fluid seal means comprising annular non-segmental first and second flexible relatively concentric elements, said elements being relatively rotatable and having their concentrically opposed faces adapted to serve as coincident conical sealing surfaces, each of said elements having a radial cross section substantially in the form of a right triangle, said first and second elements each having metal support rings embedded therein generally adjacent their inner and outer peripheries, respectively, said first and second elements in their concentrically assembled positions being substantially bounded within the area defined by two radial planes, said sealing surfaces extending across the axial dimension of said area bounded.

7. A fluid seal means comprising annular non-segmental first and second flexible relatively concentric elements, said elements being relatively rotatable and having their concentrically opposed faces adapted to serve as coincident conical sealing surfaces, each of said elements having a radial cross section substantially in the form of a right triangle, said first element rigidly secured at its inner periphery to a first metal ring, said second element rigidly affixed at its outer periphery to a second metal ring, annular grooves in the radial walls of said elements, and spiral springs in each of said annular grooves and in radial contact therewith whereby said elements are thrust toward each other into sealing contact at their said respective sealing surfaces, said first and second elements in their concentrically assembled positions being substantially bounded within the area defined by two radial planes, said sealing surfaces extending across the axial dimension of said area bounded.

8. A fluid seal means according to claim 7 wherein said second element is comprised of material having less flexibility than said first element.

9. A fluid seal means comprising annular non-segmental first and second flexible relatively concentric elements, said elements being relatively rotatable and having their concentrically opposed faces adapted to serve as coincident conical sealing surfaces, each of said elements having a radial cross section substantially in the form of a right triangle, said second element having its outer periphery rigidly affixed to a metal support ring, annular grooves in the radial walls of said elements, and spiral springs in each of said annular grooves and in radial contact therewith whereby said elements are thrust toward each other into sealing contact at their said respective sealing surfaces, said first and second elements in their concentrically assembled positions being substantially bounded within the area defined by two radial planes, said sealing surfaces extending across the axial dimension of said area bounded.

10. A fluid seal means comprising annular non-segmental first and second flexible relatively concentric elements, said elements being relatively rotatable and having their concentrically opposed faces adapted to serve as coincident conical sealing surfaces, each of said elements having a radial cross section substantially in the form of a right triangle, said opposed faces being non-parallel when said elements are in spaced relation, said first and second elements in their concentrically assembled positions being substantially bounded within the area defined by two radial planes, said sealing surfaces extending across the axial dimension of said area bounded.

References Cited in the file of this patent

UNITED STATES PATENTS

| 807,981 | Whitaker | Dec. 19, 1905 |
| 1,861,275 | Hopkins | May 31, 1932 |
| 2,350,697 | Petch | June 6, 1944 |
| 2,444,249 | Estey | June 29, 1948 |
| 2,467,312 | Jack | Apr. 12, 1949 |
| 2,583,019 | Saywell | Jan. 22, 1952 |

FOREIGN PATENTS

| 95,367 | Austria | Dec. 27, 1923 |

UNITED STATES PATENT OFFICE

CERTIFICATE OF CORRECTION

Patent No. 2,908,521                                                          October 13, 1959

Charles H. Kangas

It is hereby certified that error appears in the printed specification of the above numbered patent requiring correction and that the said Letters Patent should read as corrected below.

Column 4, line 55, claim reference numeral, for "2" read -- 1 --.

Signed and sealed this 14th day of June 1960.

(SEAL)
Attest:

KARL H. AXLINE                                        ROBERT C. WATSON
Attesting Officer                                  Commissioner of Patents